United States Patent
Battyani (10) Patent No.: US 9,904,931 B2
(45) Date of Patent: *Feb. 27, 2018

(54) FPGA MATRIX ARCHITECTURE

(71) Applicant: NovaSparks, Inc., New York, NY (US)

(72) Inventor: Marc Battyani, Arlington, MA (US)

(73) Assignee: NovaSparks, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,111

(22) Filed: Sep. 12, 2016

(65) Prior Publication Data

US 2016/0379227 A1 Dec. 29, 2016

Related U.S. Application Data

(63) Continuation of application No. 13/768,773, filed on Feb. 15, 2013, now Pat. No. 9,443,269.

(Continued)

(51) Int. Cl.
*G06Q 40/00* (2012.01)
*G06F 15/173* (2006.01)
(Continued)

(52) U.S. Cl.
CPC ......... *G06Q 30/0201* (2013.01); *G06Q 40/04* (2013.01); *H04L 67/32* (2013.01); *G06Q 10/1097* (2013.01)

(58) Field of Classification Search
CPC .............................................. G06Q 10/1097
(Continued)

(56) References Cited

U.S. PATENT DOCUMENTS 5,892,962 A * 4/1999 Cloutier .............. G06F 15/8023
712/10
5,893,128 A * 4/1999 Nauckhoff .............. G06F 9/466
715/210

(Continued)

FOREIGN PATENT DOCUMENTS

EP 2 251 794 A1 11/2010

OTHER PUBLICATIONS

Denholm et al., Low Latency FPGA Acceleration of Market Data Feed Arbitration. 2014 IEEE 25th International Conference on Application-specific Systems, Architectures and Processors (ASAP).

(Continued)

*Primary Examiner* — Edward Chang
(74) *Attorney, Agent, or Firm* — Wolf, Greenfield & Sacks, P.C.

(57) ABSTRACT

High volume data processing systems and methods are provided to enable ultra-low latency processing and distribution of data. The systems and methods can be implemented to service primary trading houses where microsecond delays can significantly impact performance and value. According to one aspect, the systems and methods are configured to process data from a variety of market data sources in a variety of formats, while maintaining target latencies of less than 1 microsecond. A matrix of FPGA nodes is configured to provide ultra-low latencies while enabling deterministic and distributed processing. In some embodiments, the matrix can be configured to provide consistent latencies even during microburst conditions. Further book building operations (determination of current holdings and assets) can occur under ultra-low latency timing, providing for near instantaneous risk management, management, and execution processes, even under microburst conditions. In further embodiments, a FPGA matrix (Continued)

provides a readily expandable and convertible processing platform.

22 Claims, 6 Drawing Sheets

Related U.S. Application Data

(60) Provisional application No. 61/612,668, filed on Mar. 19, 2012, provisional application No. 61/599,856, filed on Feb. 16, 2012.

(51) Int. Cl.
*G06F 15/16* (2006.01)
*G06Q 30/02* (2012.01)
*G06Q 40/04* (2012.01)
*H04L 29/08* (2006.01)
*G06Q 10/10* (2012.01)

(58) Field of Classification Search
USPC .................................. 709/226, 227
See application file for complete search history.

(56) References Cited

U.S. PATENT DOCUMENTS

| | | | |
|---|---|---|---|
| 8,150,970 B1 * | 4/2012 | Whillock | G06F 9/505 709/219 |
| 9,443,269 B2 | 9/2016 | Battyani | |
| 2003/0140111 A1 * | 7/2003 | Pace | G06F 8/60 709/214 |
| 2013/0226764 A1 | 8/2013 | Battyani | |

OTHER PUBLICATIONS

Sherman et al., Building the Book: A Full-Hardware Nasdaq Itch Ticker Plant on Solarflare's AoE FPGA Board. May 31, 2013; 18 pages.

* cited by examiner

FPGA MATRIX ARCHITECTURE

RELATED APPLICATIONS

This application is a continuation of and claims priority under 35 U.S.C. § 120 to U.S. application Ser. No. 13/768,773, entitled "FPGA MATRIX ARCHITECTURE," filed on Feb. 15, 2013. U.S. application Ser. No. 13/768,773 claims priority under 35 U.S.C. § 119(e) to U.S. Provisional Application No. 61/599,856, entitled "FPGA MATRIX ARCHITECTURE," filed on Feb. 16, 2012; and to U.S. Provisional Application No. 61/612,668, entitled "INTELLIGENT DISTRIBUTED NETWORK BASED RELIABLE MULTICAST," filed on Mar. 19, 2012, which applications are incorporated herein by reference in their entirety

BACKGROUND

In trading markets large volumes of data are fed to market participants in a variety of formats which can vary based on the exchange from which data is sourced. Messages defining trading activity (e.g., buys, sells, puts, options, etc.) are bundled according to a variety of formats into packets and distributed at massive volumes. Designing systems that can lower latency (communication and/or processing delays) for those messages represents significant advantages to a commodities exchange and any parties participating in trading on the exchange.

Some conventional approaches have attempted to lower latency associated with processing and communicating market data as quickly as possible. In one example, a conventional system for processing market feed data relies on conventional server based components. Such systems can employ conventional CPU architectures and communicate over network interfaces cards (NICs) to process a market data feed and communicate the processed data. In another example, commodity servers can be augmented with hardware acceleration, and the hardware acceleration components can be configured to assist in processing the data from the data feed. Partially processed data can be returned from the hardware acceleration component to a conventional CPU to complete processing. In yet another example, hardware acceleration devices can include a co-processor with a convention CPU to handle offloading of processing of the data.

SUMMARY OF INVENTION

It is realized that while these conventional approaches have managed to reduce latency to some degree, the conventional approaches still fail to provide the lowest latency and many fail to address the "bursty" nature of the market data feeds being processed. Data bursts are common in many high volume data feeds and in particular market data feeds that deliver trading or market exchange data. Historically, market data feed rates have been increasing at an overwhelming rate, in some instances, exponentially. In one example, a data flow rate for an exchange was measured at 900,000 messages/sec in 2008 and has only increased since then. Data bursts upwards of 4 times that rate can occur over short periods of time, typically measured in milliseconds.

It is realized that conventional approaches that employ commodity CPU systems and/or incorporate hardware acceleration components still fail to provide the lowest latency. Further, such conventional approaches are still subject to "micro-bursts" in the data being received. Microbursts can be identified when the message data flow is at least 4× higher than the average daily message rate. Microbursts in the data transmission rate conventionally result in memory bottlenecks, OS overhead, and poor parallelism affecting or increasing the latency for processing the data feed. Processing under microburst conditions can also be affected by compiler limitations and slow networking stacks, which can impact performance driving up latency times. Additionally, it is realized that the architecture of conventional approaches that rely on CPU as the primary data processing element with co-processing or off-load processing is not easily scalable or reconfigurable.

Accordingly, a high volume data feed handler is provided to address some of the issues with known approaches. The high volume data feed handler can be architected with a matrix of field programmable gate arrays (FPGA). The matrix can be configured with a plurality of FPGA nodes connected by high-speed low latency connections. A communication protocol can be defined on the matrix, to provide lightweight and ultra-low latency (>1 microsecond) communication between nodes. Further, execution on the FPGA nodes in the matrix can be synchronized to guarantee deterministic execution across the matrix. According to one aspect, the high volume data feed handler is configured to process data from a variety of market data sources in a variety of formats, while maintaining target latencies of less than 1 microsecond. The matrix of FPGAs provides for the lowest latencies while enabling deterministic distributed processing. The matrix can be configured to provide consistent latencies even during microburst conditions.

Further, according to one embodiment, the high volume data feed handler is configured to scale easily to accommodate new data feeds and/or formats and increased data traffic from existing feeds. In one example, additional FPGAs can be readily added to the matrix. In another example, the existing matrix can be re-configured to incorporate new data feeds and/or formats. According to one embodiment, deterministic latency can be provided by the high volume data feed handler regardless of the number and data volume of the data feeds. According to some aspects, the feed handler can be constructed and arranged of a matrix of FPGA nodes. Each node can include a large FPGA processing device, dedicated memory and direct connections to other nodes in the matrix. In some embodiments, the FPGA nodes can be linked through raw binary interconnections. In other embodiments, different connections can be configured as part of the matrix. As discussed, the matrix architecture can be configured for expansion by connecting new FPGA nodes to an existing matrix or by redefining processing tasks of nodes within the matrix.

According to one aspect a system for processing high volume market data feeds is provided. The system comprises a matrix of FPGA nodes, wherein each FPGA node includes respective memory, and I/O connected to one or more high volume market data feeds, a plurality of low latency high bandwidth connections between respective FPGA nodes, wherein the matrix defines at least one group of a plurality of the FPGA nodes, wherein the at least one group is configured to: synchronize execution across the members of the at least one group of the FPGA nodes, accept and process data communicated in first format from a high volume market data source, and distribute the data according to content rules defining processing responsibility for each node in the at least one group of the FPGA nodes.

According to one embodiment, the low latency high bandwidth connections are configured to provide raw binary connections between respective FPGA nodes. According to one embodiment, each FPGA node includes at least one point to point connection to another node in the at least one group of FPGA nodes. According to one embodiment, the at least one group of a plurality the FPGA nodes includes a content routing component. According to one embodiment, each FPGA node in the at least one group includes at least one content based rule upon execution identifies data to be processed by the respective FPGA node. According to one embodiment, the at least one content based rule includes definition of a transaction identifier and a node responsible for processing the data according to the transaction identifier.

According to one embodiment, each FPGA node in the at least one group includes at least one configuration for distributing data to be processed by others nodes in the at least one group. According to one embodiment, the at least one group of FPGA nodes includes at least one dispatcher node configured to distribute work within the at least one group. According to one embodiment, the at least one dispatcher node is configured to determine a responsible node for processing data received from the one or more high volume market data feeds. According to one embodiment, the at least one dispatcher node is configured to analyze received data to determine a content identifier. According to one embodiment, each FPGA node in the at least one group includes the at least one content based rule upon execution identifies a responsible node within the at least one group to process by the data.

According to one embodiment, each FPGA node in the at least one group includes configuration settings for point to point communication with other nodes in the at least one group. According to one embodiment, each FPGA node in the at least one group is configured to route received data according to the at least one content based rule and the configuration settings. According to one embodiment, the system further comprises a merge component configured to merge data from a plurality of data feeds and communication formats according to common transaction identifiers. According to one embodiment, the system further comprises an aggregation component configured to generate an order book including current holdings according to processed data from the plurality of data feeds.

According to one embodiment, the system further comprises an aggregation component configure to store current assets for one or more data consumers, and dynamically generate an order book reflecting the current assets responsive to processed data from the one or more high volume market data feeds. According to one embodiment, the system further comprises a customization component configured to accept user defined trading algorithms post installation for execution on one or more nodes of the at least one group. According to one embodiment, the system further comprises an execution component configured to define trading transactions for execution responsive to the processed data. According to one embodiment, the system further comprises a subscription component configured to receive subscription requests to distribute trade data. According to one embodiment, the subscription component is configured to define subsets of the trade data responsive to user requests for distribution.

According to one aspect a computer implemented method for processing high volume market data feeds is provided. The method comprises receiving, at one or more FPGA nodes, trade data from one or more high volume market data feeds, routing, the trade data by the one or more FPGA nodes within a matrix of FPGA nodes according to content based configurations, processing the trade data at respective FPGA nodes with the matrix, wherein processing of the trade data includes synchronizing execution of the FPGA nodes with the matrix, distributing, processed trade data to data consumers according to subscription information.

According to one embodiment, the method further comprises receiving, directly, at the one or more FPGA nodes, trade date from a plurality of high volume market data feeds having a plurality of communication formats, and merging the trade data from the plurality of high volume market data feeds. According to one embodiment, the method further comprises generating an order book specifying current assets responsive to the trade data. According to one embodiment, the method further comprises generating trade execution instructions automatically responsive to the trade data.

According to one embodiment, the method further comprises accepting customized processing instructions for causing at least one node of the FPGA matrix to execute customized functions post installation. According to one embodiment, the method further comprises enabling deterministic distribution of the trade data within the matrix of FPGA nodes. According to one embodiment, the method further comprises communicating within the matrix of FPGA nodes using point to point connections, adding only a header and checksum to data payload.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

At least some embodiments disclosed herein include apparatus and processes for a high volume data feed handler configured to process data from a variety of market data sources delivered in a variety of formats. Various embodiments, of the high volume data feed handler are configured to process incoming market data and maintaining a target latency of less than 1 microsecond in delivering processed market data. Processing of the data can include, for example, decompression, sorting sending, copying, calculating on received data, calculating on received data against stored data, etc. In other examples, the feed handler can be configured to handle trade data messages defining trading activity having specific communication formats according to the data source (e.g., NASDAQ feed) and process that trade data according to the data fields expected for the specific format. For example, various financial calculations can be performed including calculation of an index, stock exchange portfolio value, weighted averages, or other financial calculation for the data received. Further, various embodiments are configured to provide consistent latencies for receipt, processing, and distribution even during microburst conditions, regardless of the data source or the calculations to be performed.

In some implementations, the high volume feed handler is based on a matrix of individual FPGA nodes, where the matrix can be scaled easily to accommodate new data feeds and/or formats and increased data traffic from existing feeds. For example, the feed handler can be constructed and arranged of a matrix of FPGA nodes. In some embodiments, the FPGA nodes in the matrix can be linked through raw binary interconnections. In one example configuration, FPGA nodes are connected via point-to-point connections to the other nodes in the matrix over the raw binary connections. In other embodiments, different connections can be implemented. The configuration of the matrix can be defined at installation and can be reconfigurable post deployment. In some examples, direct communications connections can be added and/or removed to provide different topologies of the matrix as needed (including e.g., bus, line, tree, full, star, mesh, and ring architectures or any combination thereof). Different topologies can be selected or re-configured post installation, for example, to emphasize data distribution, data processing, etc. The matrix architecture can also be configured for expansion by connecting new FPGA nodes to an existing matrix.

Figure 1:
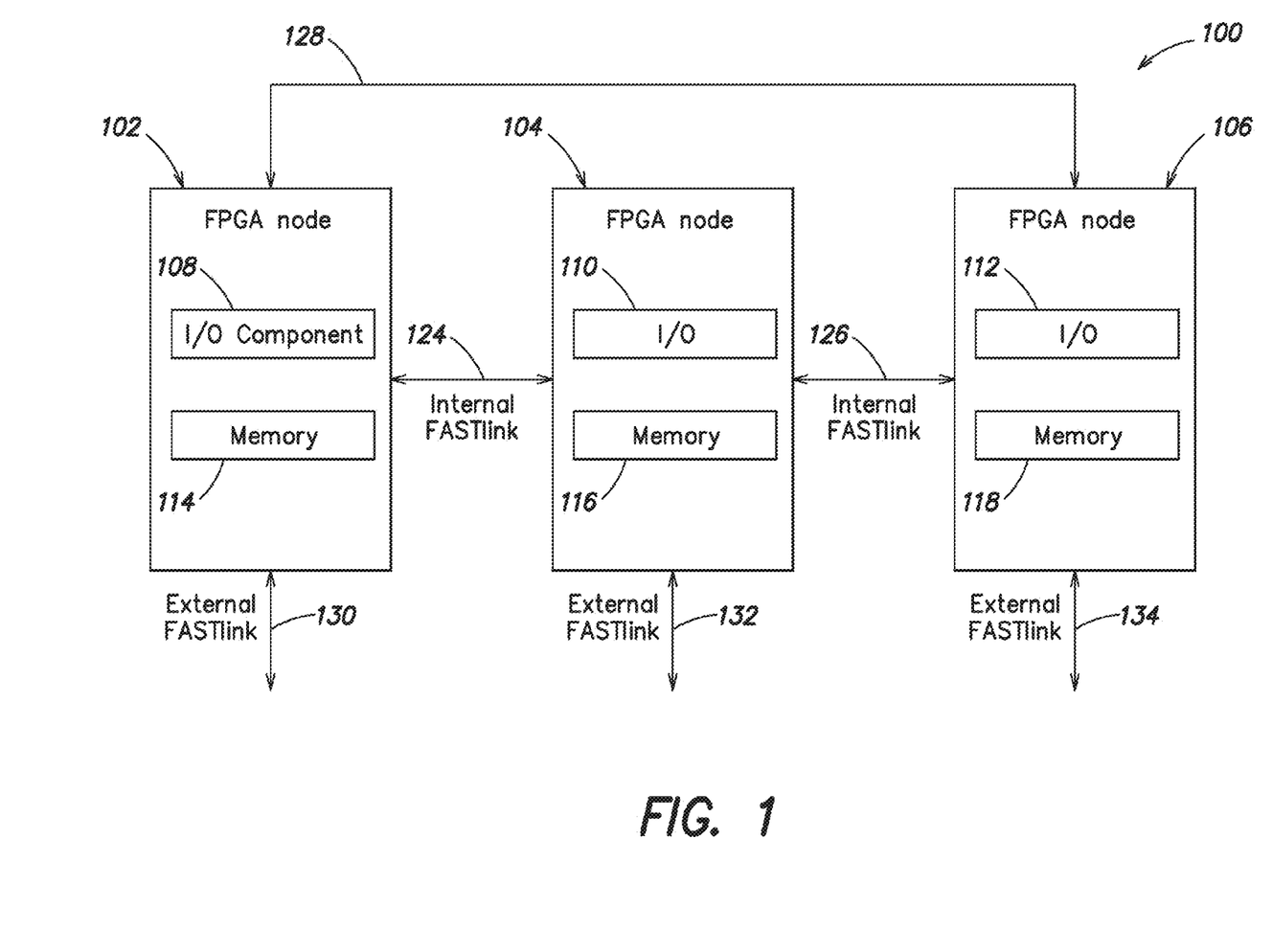
FIG. 1 is an example of a block diagram of system for processing high volume trade data according to one embodiment.

Shown in FIG. 1 is an example of a block diagram of system 100 for processing high volume trade data according to one embodiment. The system 100 is configured to accept and process one or more trade data feeds communicated over a communication network (not shown—e.g., dedicated high speed connection). The trade data feeds can come from a variety of market processing systems (including e.g., NASDAQ, NYSE, Euronext, the London, Shanghai, Hong Kong, and Tokyo Stock Exchanges, BATS PITCH for BYX AND BZX data feeds, DirectEdge NG-A and NG-X data feeds, Acra XDP Integrated feeds, LSE Millennium Level 2 Feeds, Turquoise Millennium Level 2 feeds, etc.). The trade data feeds can be connected to a feed handler (e.g., system 100). Each of the trade data feeds can be processed directly by nodes within the FPGA matrix. The processing at each node can include data parsing, book building, filtering, distribution to other nodes, custom trade processing algorithms, and consolidation of trade orders across the plurality of markets associated with the trade data feeds being delivered to the matrix of FPGA nodes. In some embodiments, the feed handler can be constructed and arranged of a plurality of FPGA boards (e.g., as discussed in greater detail with respect to FIG. 2). System 100 illustrates an example embodiment having three single FPGA nodes (102, 104, and 106).

Each FPGA node (e.g., 102-106) can be configured with its own set of I/O and memory (e.g., I/O component 108, 110, 112, and memory 114, 116, and 118). In some architectures each node can be assigned specific tasks within the matrix, and include configuration settings for delivering task specific messages to nodes within the matrix. The architecture can be configured to permit ready expansion of an FPGA matrix by addition of new FPGA nodes to the matrix and assigning new or a subset of tasks to the new FPGA node. For example, upon connection of the new FPGA node, a synchronization process can be executed to synchronize the processing of all the FPGA nodes within the matrix. Further, content based routing instructions can be defined for each node such that various FPGA nodes in the matrix are configured to process designated work and deliver other computational work (e.g., processing, communication, etc.) to a designated node within the matrix.

The communication setup and communication architecture can be configured to specific implementations, and can be re-configured post installation. In one example, post installation re-configuration can add new data feeds. In another example, re-configuration can optimize loads on the matrix and/or individual FPGA nodes by dedicating resources based on analysis of historical processing loads.

In some embodiments, each FPGA node in system 100 can be interconnected via raw binary connections (e.g., internal "FASTLink" connections 124, 126, 128). Shown is an example topology of connections, in other embodiments different topologies can be implemented. According to one embodiment, all functions of a market processing system can be executed within hardware of the FPGA matrix, including for example, data parsing, book building, filtering, distribution, custom algorithm execution, etc. The respective functions can be distributed throughout nodes of the system (e.g., 100), which can deliver results deterministically irrespective of the number of data feeds received, the receive rate of the data, or the number of downstream customers receiving data processed by the FPGA matrix.

In other systems, an FPGA node can include one or more FPGAs. For example, each node in system 100 can also be implemented with a plurality of FPGAs to provide additional processing capacity. In some implementations, FPGA nodes can be arranged into an appliance having a set of functions specific to the use of the appliance. For example, the appliance can be specially configured to handle a specific data feed having a specific communication structure. In some embodiments, an appliance can be specially configured to perform specific operations on a raw data feed or a processed data feed, for example, received from another FPGA node or appliance. Multiple appliances can be implemented together into a matrix of appliances that enable a system (e.g., 100) to process a plurality of data sources and data architectures.

In some embodiments, up to three nodes can be configured in a single appliance, although in other embodiments a larger number of FPGA nodes can be configured in one appliance. The FPGA nodes illustrated are configured to be connected ad-hoc to any number of other nodes, which can also be present in another appliance. FPGA nodes can be connected via high-speed internal connections as well as raw binary connections discussed above.

As shown in FIG. 1, each FPGA node (e.g., 102-106 of system 100) can be connected to another FPGA node via a high-speed internal connection, for example, an internal FASTLink connection (e.g., 124, 126, and 128). According to one embodiment, FASTLink connections are abstracted from the underlying physical implementation.

In some example implementations, FASTLink connections can employ available transceiver assemblies provided with commercially available FPGAs. In one example, an FPGA can include a known GXB transceiver (e.g., transceiver hard cores available within Altera Stratix IV FPGAs). According to some embodiments, the physical layer of the FASTLink connection can configured to employ a serial differential connection with 8/10 bit encoding. The connections can be configured to employ Low Voltage Differential Signaling (LVDS) signaling.

In some examples, the connections are configured to provide a data rate between nodes on the order of 16 Gbits/s, although these data rates can be augmented by scaling of the connections to provide data rates on the order of 27.2 Gbit/s. In one implementation, 128 bit wide words are accepted on the input of a FASTLink interface. The physical connections between adjacent nodes in the matrix can include internal ribbon cables. For non-adjacent nodes, and nodes in other appliances, a four lane PCIe cable can be used to carry the FASTLink signals.

The communication configuration of the matrix of nodes can include a lightweight communication protocol. According to one embodiment, each node is configured to communicate messages with a 16 bit header and checksum in the footer within the matrix. The lightweight protocol is configured to optimize utilization of the maximum bandwidth of the link. Some conventional approaches (e.g., 10 G Ethernet) would consume communication bandwidth with set up and delivery information, slowing transmission between nodes.

Furthermore, in some embodiments, once an initial synchronization between each end of a FASTLink connection is performed, data can be sent at will without the need to setup each transfer. According to one embodiment, this provides lower latency than, for example, a PCIe link, which would require each data transfer to be setup, despite offering the same data rate as 16 Gbits/s. According to another embodiment, the matrix is implemented with point-to-point connectivity between the nodes over raw binary connections (e.g., FASTLink connections).

According to some implementations, the matrix can be configured to provide a message oriented architecture over the FASTLink connections. With the known connections (e.g., FASTLink), the message oriented architecture is able to distribute messages from data feeds with little or no communication overhead (e.g., no source or destination addresses are required as with the Ethernet or PCIe protocols, reducing the protocol overhead and maximizing utilization of bandwidth). In some implementations, packet transmissions received from data feeds can be processed before the entire packet is even received by the data handler.

For example, many trade data feeds communicate a plurality of market messages within a data packet payload. The message oriented architecture is configured to process individual messages within the data packet as they are being received. Content based routing configurations can enable the data handler (e.g., system 100) to communicate messages based on content routing configurations to specific nodes within the matrix before the entire packet is received.

Internal connections between FPGA nodes need not be to adjacent nodes, and in some embodiments, each node can include a connection to all the other nodes within an appliance. Further the FASTLink architecture can be implemented on external connections (e.g., to other appliances, downstream data consumers, etc.). According to one embodiment, downstream data consumers can receive processed data via external FASTLink connections or other communication channels (e.g., 130, 132, and 134) configured for high speed connectivity to external systems.

External FASTLink connections can incorporate the same lightweight communication protocols discussed above. For example, point to point connections to downstream data consumers can be defined and used by nodes in the FPGA matrix to deliver communications to data consumers without requiring message setup or bulky transport data.

According to one embodiment, each FPGA node is constructed and arranged on an FPGA board. In some embodiments, an FPGA board is constructed with one FPGA processing device. In other embodiments, an FPGA board can include additional FPGA processing devices. The FPGA board can include a large FPGA processing device.

Figure 2:
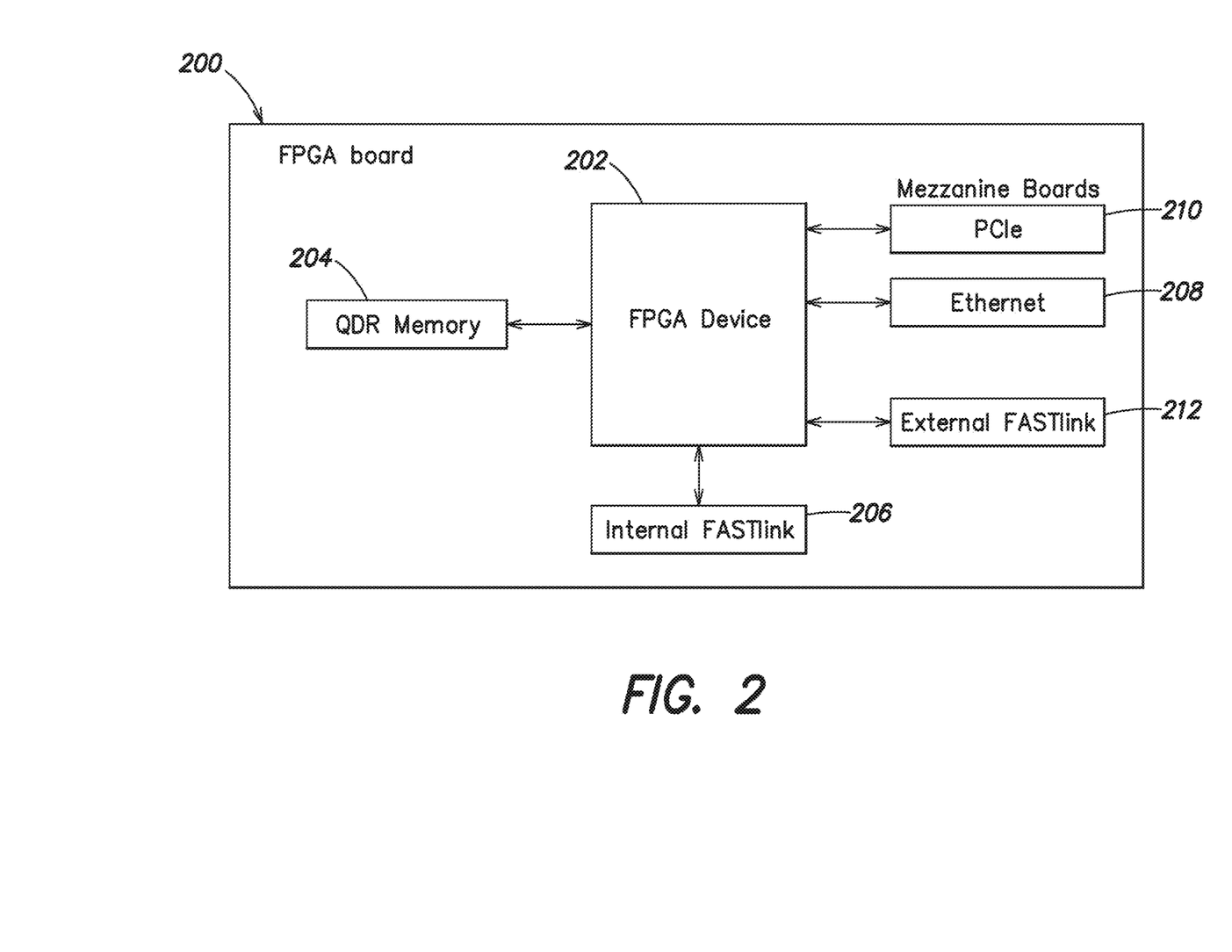
FIG. 2 is an example block diagram of an architecture of an FPGA board according to one embodiment.

Shown in FIG. 2 is an example block diagram of an architecture of an FPGA board 200 according to one embodiment. The processing of the feed data can be performed by the board 200 on the FPGA device 202. Each board can be configured with its own memory (e.g. 204). In one example, a board is configured with six QDR memories, although in other embodiments, fewer or additional memories can be configured. The board can include physical connections 206 to provide for internal FASTLink communication to other boards and/or FPGA nodes. The FPGA board can include additional mezzanine boards to provide for specialized functionality. In one embodiment, the FPGA board is configured to accept up to 8 mezzanine boards. The mezzanine boards or daughter boards can be configured to manage external connectivity. In some embodiments, the mezzanine boards are configured to provide any combination of Ethernet 208, point-to-point PCIe 210, or external FASTLink communication 212 to other FPGA nodes or downstream data consumer systems.

Figure 3:
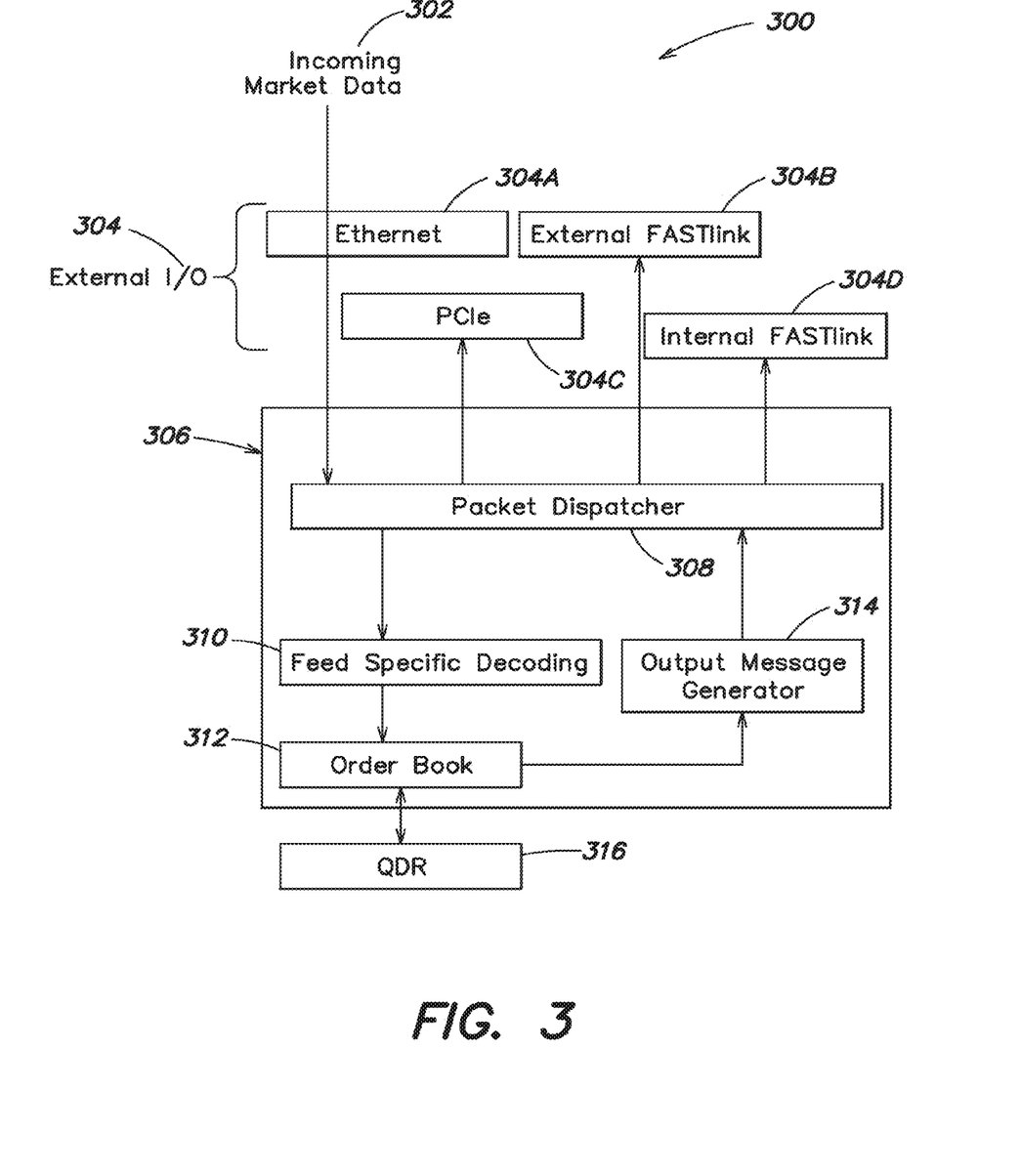
FIG. 3 is an example block diagram of a system architecture and data flow according to one embodiment.

Shown in FIG. 3 is an example block diagram of a system architecture and data flow 300, according to one embodiment. As shown market data (e.g., 302) from an exchange can enter the FPGA board 306 via external I/O 304. In some embodiments, external I/O is performed by mezzanine boards, which can include for example an Ethernet mezzanine board. Other communication hardware can be used to receive data from the market exchange (e.g., external FASTLink connections, PCIe connections, and internal FASTLink connections from other FPGA nodes and/or appliances). Processing takes place on the FPGA board 306. Processing by the FPGA device can be executed by an FPGA device installed on the board using external QDR RAM (e.g., 316).

In some embodiments, a packet dispatcher component 308 executed on the FPGA device is able to distribute processed data to any of the mezzanine cards, or other FPGA nodes via the configured connections. The configured connections can include internal FASTLink connections to other FPGA nodes 304D, Ethernet connections 304A, PCIe connections 304C, and external FASTLink connections 304B, among other options. In other embodiments, the packet dispatcher 308 can be configured to deliver unprocessed data to other FPGA nodes. For example, the packet dispatcher 308 can be configured to analyze received market data to determine if the current FPGA board should process the data. If not the packet dispatcher 308 can be configured to consult content based rules identifying an appropriate node for the data and route the data accordingly.

According to some embodiments, the latency of the packet dispatcher is constant (constant number of clock ticks to determine if current node should process, constant number of clock ticks to identify responsible node, and constant number of clock ticks to forward) irrespective of the throughput or number of outputs. If the data is determined to be for the current board 306, the dispatcher 308 will pass the data to a feed decoder 310. In some embodiments, each board may have one or more feed decoders for processing market data (e.g., offers, puts, buy orders, sell orders, short sales, long sales, options, derivative exchanges, etc.) from specific feeds to determine, for example, a change in market holdings for a customer. For example, the customer can be provided an order book responsive to market activity (e.g., buys, sells, offers, puts, shorts, etc.) processed in the feed decoder 310. The order book can be generated by an order component 312 based on applying the market activity to an existing portfolio. For example, a customer can subscribe to a feed handler service to enable the customer to have the lowest latency access to data on their portfolio or order book. The customer's existing order book can be stored in a memory of an FPGA node (e.g., QDR 316) and market activity can be applied to the order book to generate in real-time with low latencies the customer's current order book. The order book can be transmitted by an output message generator 314.

Further, feed decoders (e.g., 310) can be allocated subsets of data from a specific feed, and processing can be distributed based on subsets of the data for a specific feed. In one example, processing can be partitioned based on stock symbol, with one node processing transactions or other activity for the subset of symbol data and another node can be responsible for processing the remainder. Other embodiments can implement different partitions of the data to be processed over any number of FPGA nodes.

According to one embodiment, processing in an FPGA matrix is configured to be directly executed entirely in hardware rather than offloading processing from a CPU to an FPGA. In one example, market feed data is received directly by an FPGA node and distributed by the FPGA node to other FPGA nodes within a matrix. Each FPGA node in the matrix can include configuration information on the other nodes in the matrix to enable content based routing of messages within the matrix. Each node within the matrix can with minimal latency determine if a data message is to be processed by the current node and if not where to deliver the message. Further, synchronization of execution across the nodes in the matrix can enable the system to ensure fair and deterministic processing of market activity (including, for example, transactions, information updates, etc.).

In some embodiments, a feed handler and its matrix of FPGA nodes can be configured for "cut through" processing to achieve lower latency and prevent bottlenecks. In one example, Ethernet data is provided in packetized form. Each Ethernet packet can include a number of messages, for example, from a market exchange. An FPGA node and/or the feed handler (e.g. system 100) can be configured to output processed market data messages from within the data packet while other messages within the same packet are still entering the matrix of FPGA nodes from the exchange, providing cut through processing. Each message can be analyzed as it is received as part of the data packet. The analysis can determine content based identifiers within the message to deliver the message to a specified FPGA node configured to process it.

As discussed, connectivity to or between FPGA boards and/or nodes can be configured to operate through low latency raw binary communication links. Thus, delivery of messages within a data packet to other nodes in the matrix can occur, in some examples, at a faster rate than delivery remainder of the data packet. In other embodiments, FPGA boards and/or nodes can communicate to other nodes via Ethernet connections, including for example, 10 Gigabit connections between boards/nodes.

In one embodiment, connectivity between nodes is configured via point to point connections. The point to point connections can be configured to employ Low Voltage Differential Signaling (LVDS) signaling. In other embodiments, different communication modes may be used. Further, with larger FPGA devices two or more FPGA nodes can be installed on a single device and include physical connections on a circuit board itself.

Workload can be distributed across multiple FPGA boards/nodes with constant latency. In some embodiments, data feeds can be distributed between multiple FPGAs to allow for parallel processing of the data feed. In some embodiments, a packet dispatcher is configured to split the data feed received between multiple FPGA boards or nodes. In another embodiment, the data feed can be split on the basis of the stock symbols on which operations are to be performed. One set of stock symbols can be processed on one FPGA and another set of symbols processed on another FPGA. In some examples, partitioning of the stock symbols can be based on alphabetical groupings, in other examples, partitioning of the stock symbols can be based on trade volume. In further implementations, partitioning of processing can be based on heuristic analysis of data processing and incorporate dynamic load balancing.

According to some embodiments, different types of FPGA nodes can be configured to accomplish specific tasks with respect to processing received data feeds. In one example, FPGA nodes can include a market data processing node, which is configured to receive and process feed data. In another example, a trader defined algorithm node can be configured to operate on processed feed data or received raw feed data. Further, various embodiments of an FPGA matrix can include connections to one or more conventional CPU processing systems. In one example, data analytic information can be communicated to CPU processing device to provide for analysis of the data received, data receive rates, data volume, data delivery rates, among other options. According to one embodiment, an FPGA matrix is configured to invert the conventional paradigm CPU primary processing with FPGA off-load processing by making the FPGA matrix the primary processing device with additional and/or off-load functionality supplied by a conventional CPU processor. In some embodiments, downstream clients can interact with CPU processing devices to subscribe to receive processed data, specific information on user defined symbols, and/or other user defined subsets of data delivered to the feed handler/matrix.

According to one embodiment, trader defined algorithm nodes are configured to permit a custom algorithm to be configured on an FPGA node within the matrix. Oftentimes, the operations performed by a trading entity in resolving, for example, trades received are viewed as the most highly confidential information. Rather than requiring a trading entity to reveal their propriety algorithm in order to configure one or more FPGA nodes for the processing required, FPGA nodes can be configured to accept custom defined algorithms that can be executed as part of the FPGA matrix. In some examples, the custom trade algorithm can provide for user functionality. The user defined functionality can include risk management operations. For example, as trades are executed a book or portfolio of holdings by a particular client may become unbalanced (e.g., exceed specified allocations) or be too exposed to different market segments. Oftentimes risk management operations can be defined to purchase or sell specific commodities, stocks, etc. to regain balance (e.g., return to specific allocation) in the portfolio automatically. Achieving execution of those risk management strategies in the shortest period of time provides significant advantage.

Described in co-pending U.S. Patent Application Publication No. 2010/0287294 is an example of an FPGA that can be specially configured as discussed herein to operate as an element of an FPGA matrix and/or high volume data feed handler.

According to some embodiments, a compiler component can be configured to define logic on an FPGA node. In some examples, a trading entity can define operations for an FPGA custom algorithm using a compiler component. In some embodiments, the compiler provides a domain specific language that enables scripting of FPGA operations at a high level, which the compiler translates into low level operations (including, for example, logic blocks executable by the FPGA) that can be configured to maximize the parallelism of the FPGAs.

EXAMPLE IMPLEMENTATION

According to some embodiments, a matrix of FPGA nodes is configured to accept a plurality of market data feeds and process the incoming data with an average latency of 400 nanoseconds with a maximum latency of 700 nanoseconds 99.99% of the time. For example, a feed handler implementing a FPGA matrix can process case equity feeds with the maximum 700 ns latency even during microburst conditions.

In some implementations, the feed handlers are designed and configured to provide data processing and distribution for principal trading firms. The feed handlers are configured to deliver consistent processing speeds, especially during periods of heavy market volume (e.g., a large number of trades in short periods of time). The FPGA matrix can be configured to provide hardware based functionality for processing received data. The hardware based functionality can include subscription-based filtering of market data, feed normalization, and further can allocate data delivered over any number of FPGA nodes guaranteeing low latency delivery of critical trade data.

Figure 4:
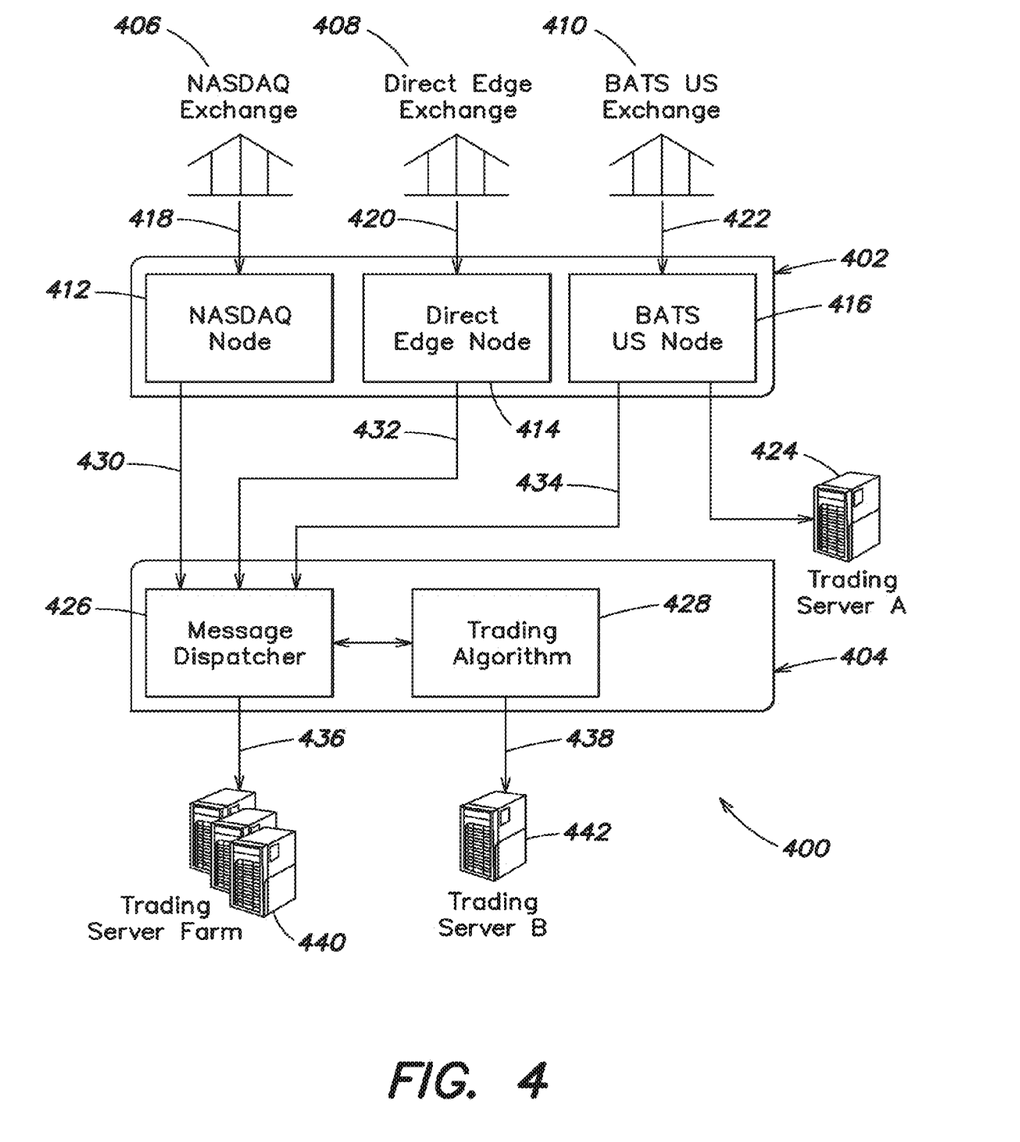
FIG. 4 is an example system including an FPGA matrix for processing and distributing market data.

Shown is FIG. 4 is an example system 400 implementing an FPGA matrix for processing and distributing market data to a number of downstream data consumers. System 400 includes appliances 402 and 404 each including a plurality of FPGA nodes. The appliances 402 and 404 are each configured to receive, process, and distribute market data with consistent and low latency. As illustrated, appliance 402 receives data from three market data sources 408 NASDAQ, 406 DirectEdge Exchange, and 410 BATS US Exchange. The appliance 402 comprises three FPGA nodes 412, 414, and 416, and the processing of each data feed (e.g., 406-410) is handled on respective nodes. Each data feed can be connected to appliance 402 over connections 418, 420, and 422, which can include, for example, 10G PCIe connections to the respective data sources.

Processing on the nodes 412-416 can include interpretations of the data delivered from the data feeds, normalization of the received data, updating of current holdings for subscribed customers, and/or execution of trades responsive to processed data, changes in holdings, etc. For example, responsive to trade data received by 416 and associated updates to current holdings (e.g., defined by an order book), trades can be automatically delivered to a trading server 424 according to a user defined trading algorithm or rule executed by the node (e.g., 416). The processed data from each feed can be delivered to appliance 404 over communication links 430, 432, and 434. As shown, appliance 404 can include two nodes 426 and 428, where node 404 is configured to receive the processed data from appliance 402. The processed data from appliance 402 can be merged at a message dispatcher 426 to provide real time holdings for any subscribed customers. In some embodiments, various stock exchange symbols can be traded through different market exchanges. In such settings, any reduction in latency in the computation and delivery of real time holdings provides systematic advantage to the party who receives the data and can act on it first. The systematic advantage can include, for example, ultra-low latency execution of trading rules that are triggered by the real time holding information.

In some embodiments, the processed and merged data can be distributed by the message dispatcher 426 to a trading algorithm node 428. The trading algorithm node 428 can be configured to execute user defined functions, process orders, generate trade requests, among other options. The message dispatcher 426 and the trading algorithm node 428 can both be configured to communicate resulting data to downstream data consumers. As shown the message dispatcher 426 can communicate processed and merged market data over communicate link 436 to a trading server farm 440. Node 428 can communicate resulting trade information over link 438 to trade server 442. According to some embodiments, the trade servers (e.g., 424, 440, and 442) can be run by the same or different trading firms. Each node provides opaqueness in communicating to respective servers, preventing any listeners from interfering with or monitoring each other.

According to one aspect, feed handler systems implementing an FPGA matrix use FPGA devices as the primary/master processing element. As discussed, this approach reverses the paradigm of the way FPGAs are conventionally used in computing systems, where FPGAs are used as slave co-processors with the majority of processing still being performed on commodity CPUs. Thus, a single FPGA node is able to connect via PCIe to a number of servers, as compared to a conventional approach with an FPGA co-processor on a PCIe card which, can be limited to interfacing with only a single server.

Figure 5:
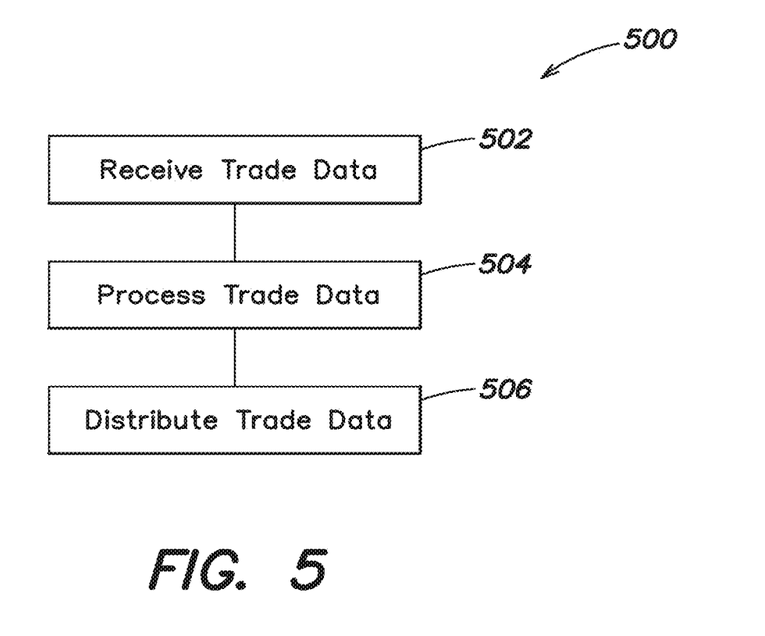
FIG. 5 is an example process flow for processing market data, according to one embodiment.

FPGA nodes and/or feed handler systems (e.g., 100, 200, 300, and 400) can implement a variety of functions to provide for ultra-low latency processing of market data. Show in FIG. 5 is an example process flow 500 for processing market data. The process 500 begins at 502 with receiving trade data from a trade data source. According to one embodiment, the trade data is received directly at a FPGA node, which can be a member of an appliance, FPGA matrix, etc. The FPGA node can be specially configured to process the specific message format received from the trade data at 502. Once trade data is received at 502, the data is processed at 504.

In some embodiments, processing at 504 can include a determination by an FPGA node whether the FPGA node is configured to process the received data or individual messages within the received data. For example, a FPGA node can analyze the received data to determine a content identifier (e.g., stock symbol, transaction identifier, etc.). The node can be configured to determine processing responsibility with the FPGA matrix based on the determined content identifier. In one example, the determination can be binary, responsible or not. If not, the node can pass the message to a message dispatcher configured to identify a responsible node within the matrix responsive to content routing configurations. In another example, each FPGA node in the matrix can include information on the content routing configuration of the matrix and distribute messages accordingly, for example, at 506.

Once data is processed at 504, the processed data can be distributed at 506. Distribution at 506 can include, for example, distribution of data messages reflecting specific trade information (e.g., buy, sell, stock, amount, price, etc.) or other trade data (e.g., current price, current offers, etc.). Further, data processed at 504 can include aggregate information on an order book, current holdings, etc. The aggregate information can be distributed to downstream data consumers at 506. Further, any processed information from 504 can be distributed to other FPGA nodes and/or appliances at 506. In some embodiments, data distributed at 506 can cause receiving systems (e.g., FPGA nodes, FPGA matrixes, appliances, etc.) to execute process 500 to receive process and/or further distribute trade data received from prior executions of process 500. In various embodiments, process 500 can include multiple executions of processing at 504 and distribution at 506 to deliver trade data to data consumers.

Data consumers may be allowed to subscribe to receive processed trade data from a data handler and/or FPGA matrix (including, for example, systems 300 and 400). During the subscription process, data consumers can specify what data feeds they wish to receive. Further, the data consumers can specify more specific information to include what subsets of a market data feed they wish to receive. In some embodiments, data consumers can provide information on their current holdings and have the data handler and/or FPGA matrix provide ultra-low latency book building, order reconciliation, and or trade execution according to user defined criteria.

Figure 6:
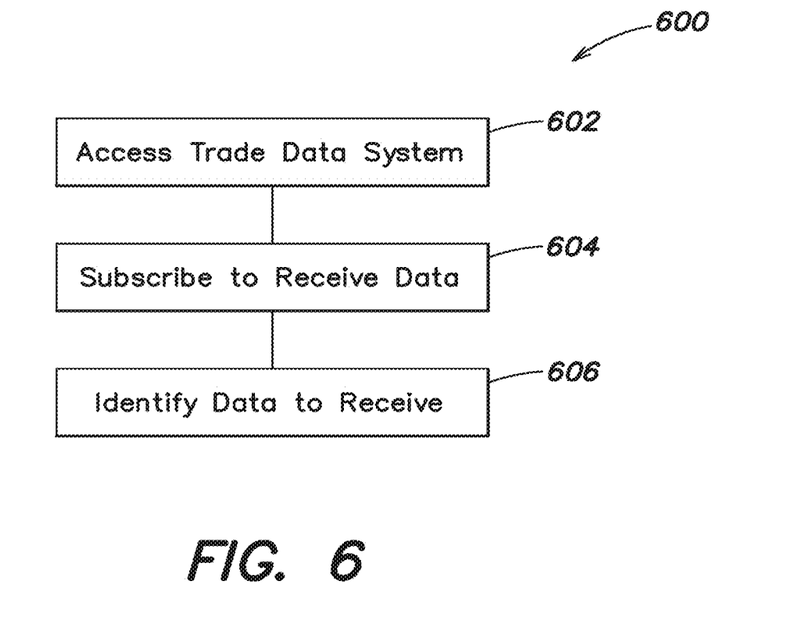
FIG. 6 is an example process flow for subscribing to receive trade data, according to one embodiment.

Shown in FIG. 6 is an example process flow 600 for subscribing to receive trade data from a feed handler or FPGA matrix. The process 600 begins at 602 with access to a data handler system. The data handler system can include one or more FPGA matrixes or appliances. Access at 602 can be provided through a web-based interface (e.g., web page, browser window, etc.). In some embodiments, an FPGA matrix can include conventional CPU processing devices configured to provide the web-based interface for access over the Internet. In other implementations, data consumers can be given secure connection information or other secured approaches for establishing initial access to the data handler system. At 604, the data consumer is given options for specifying who they are, where delivery of data should occur, and what information they wish to receive from the data handler system at 606. For example, the data consumer can specify specific data sources (e.g., trade data sources, NASDAQ, DirectEdge, and BATS US data feeds, among others). In other examples, the data consumer can specify market segments within the trade data, specific commodities, stocks, or other properties on which they wish to receive information. In some embodiments, the data handler system enables definition of any subset of the trade data supplied by a specific source at 606. Based on subscription information and specific data requested, various functions of the FPGA nodes in the FPGA matrix can be configured to deliver information to the data consumer according to user specification. In some implementations, identification of data to be received at 606 can include specification of current holdings, such that the matrix can reconcile received trade data against a current portfolio to deliver an order book (e.g., current holdings) with ultra-low latency. Further, users can also be allowed to specify actions to be taken responsive to changes in the order book and/or according to characteristics of the processed trade data.

Various embodiments, of FPGA nodes, matrixes, appliances, can execution processes 500 and/or 600 to provide some of the functions discussed herein. Further, the nodes, matrixes, and appliances can provide any combination of the functions discussed herein without the execution of processes 500 and/or 600. In various embodiments, an FPGA matrix and/or data handler can provide for processing of any high volume data source. In some implementations any data source can be processed and distributed while providing ultra-low latency (>1 microsecond). In some embodiments, an FPGA matrix can be configured to process any data source deterministically. The FPGA matrix can be clock synchronized and distribute any data received based on content routing configurations established on each node in the matrix. In other embodiments, each node can be configured to forward data for which the node is not responsible to a message dispatcher node, and the message dispatcher node can be configure to route messages according to content based configurations. In various settings, the nodes with the matrix can be configured with point to point connections using raw binary signaling to provide ultra-low latencies (e.g., no message set up is required, and minimal communication data is needed (in one example, header and checksum in addition to the data).

Figure 7:
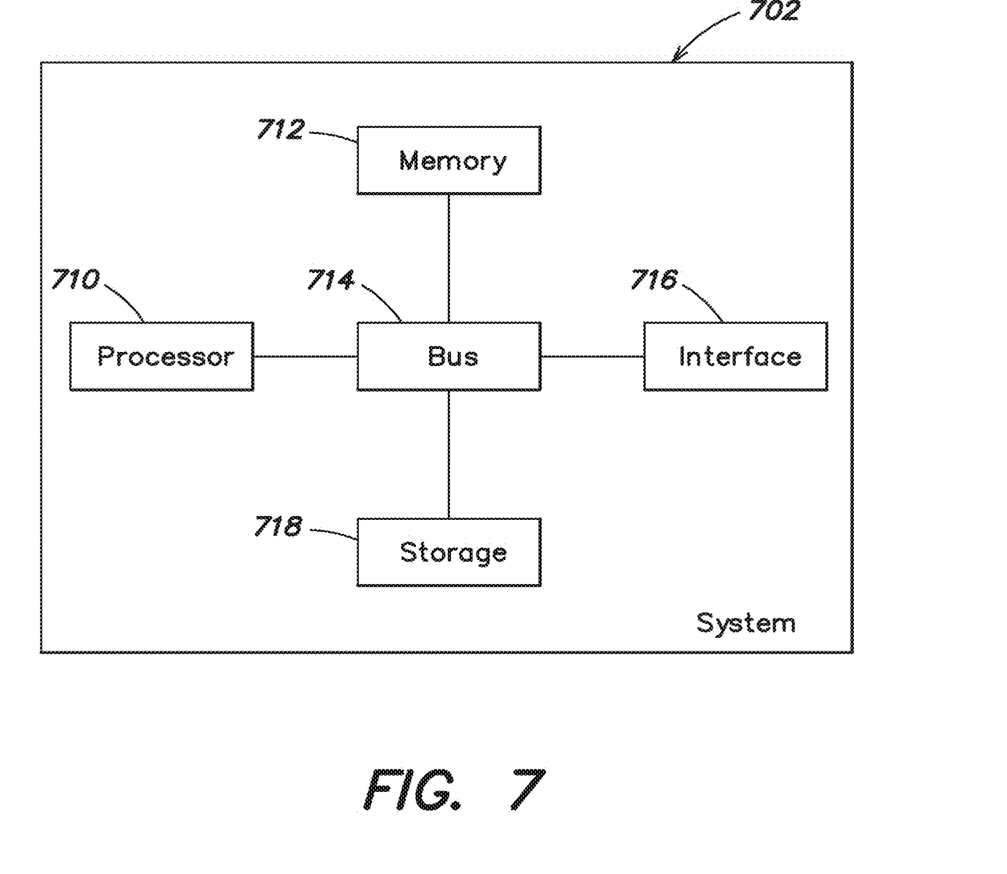
FIG. 7 is a block diagram of one example computer system that may be used in conjunction with an FPGA matrix.

As discussed above, FPGA matrixes can be architected to include connections to conventional CPU processing devices. FIG. 7 illustrates one example of a conventional CPU system, which includes a processor 710, a memory 712, a bus 714, an interface 716 and data storage 718, which can be specially programmed as disclosed herein. The processor 710 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 710 is connected to other system components, including one or more memory devices 712, by the bus 714.

The memory 712 stores programs and data during operation of the system 702. Thus, the memory 712 may be a relatively high performance, volatile, random access memory such as a dynamic random access memory (DRAM) or static memory (SRAM). However, the memory 712 may include any device for storing data, such as a disk drive or other non-volatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the bus 714. The bus 714 may include one or more physical busses, for example, busses between components that are integrated within the same machine, but may include any communication coupling between system elements including specialized or standard computing bus technologies such as IDE, SCSI, PCI and InfiniBand. The bus 714 enables communications, such as data and instructions, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage 718 includes a computer readable and writeable nonvolatile, or non-transitory, data storage medium in which instructions are stored that define a program or other object that is executed by the processor 710. The data storage 718 also may include information that is recorded, on or in, the medium, and that is processed by the processor 710 during execution of the program. More specifically, the information may be stored in one or more data structures specifically configured to conserve storage space or increase data exchange performance.

The instructions stored in the data storage may be persistently stored as encoded signals, and the instructions may cause the processor 710 to perform any of the functions described herein. The medium may be, for example, optical disk, magnetic disk or flash memory, among other options. In operation, the processor 710 or some other controller causes data to be read from the nonvolatile recording medium into another memory, such as the memory 712, that allows for faster access to the information by the processor 710 than does the storage medium included in the data storage 718. The memory may be located in the data storage 718 or in the memory 712, however, the processor 710 manipulates the data within the memory, and then copies the data to the storage medium associated with the data storage 718 after processing is completed. A variety of components may manage data movement between the storage medium and other memory elements and examples are not limited to particular data management components. Further, examples are not limited to a particular memory system or data storage system.

The computer system 702 may be a computer system including an operating system that manages at least a portion of the hardware elements included in the computer system 702. In some examples, a processor or controller, such as the processor 710, executes an operating system. Examples of a particular operating system that may be executed include a Windows-based operating system, such as, Windows NT, Windows 2000 (Windows ME), Windows XP, Windows Vista, Windows 7 or 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

One should appreciate that the present invention is not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed:

1. A network appliance for processing high volume market data feeds, the network appliance comprising:
   a matrix of at least three FPGA nodes wherein each FPGA node includes respective memory, and I/O
   wherein each of the at least three FPGA nodes includes at least two physical links, the at least two physical links each being connected to respective ones of the other nodes in the matrix each of the at least two physical links comprises a low latency high bandwidth connection;
   at least a first circuit board housing one or more FPGA nodes of the matrix of FPGA nodes;
   at least one additional external link connected to the matrix of FPGA nodes, wherein the external link is directly connected to one or more high volume real-time market data feeds, wherein the real-time market data feeds are characterized by data burst conditions and wherein at least one node in the matrix of FPGA nodes receives the one or more high-volume real-time market data feeds to extract raw market data for processing the raw market data over one of the at least two physical links to another FPGA node;
   the another FPGA node configured to build in real-time one or more order books associated with a plurality of financial instruments and generate processed market data including updates of the one or more order books, order trades, and status for financial instruments from the raw market data; and
   wherein at least one of three FPGA nodes includes at least one additional physical link and is configured to transmit messages to a plurality of trading servers over the at least one additional physical link, the transmitted messages including the processed market data for trade analysis and trade execution by one or more trading algorithms.

2. The network appliance of claim 1, wherein the at least one additional external link includes at least a first external link to a first high volume real-time market data feed in a first format and a second external link to a second high volume real-time market data feed in a second format.

3. The network appliance of claim 2, wherein a first FPGA node is configured to receive the data from the first high-volume real-time market data feed in the first format to extract raw market data for processing and communicate the raw market data over one of the at least two physical links to at least a third FPGA node.

4. The network appliance of claim 3, wherein a second FPGA node is configured to receive the data from the second high-volume real-time market data feed in the second format to extract raw market data for processing and communicate the raw market data over one of the at least two physical links to at least a third FPGA node.

5. The network appliance of claim 1, wherein each node of the matrix of FPGA nodes is housed on a respective circuit board.

6. The network appliance of claim 1, wherein the first matrix of FPGA nodes comprises a first sub-appliance configured to generate processed market data including updates of the one or more order books and communicate this processed market data to a second sub-appliance, and wherein the network appliance further comprises a second sub-appliance configured to generate order trades for one or more markets.

7. The network appliance of claim 1, wherein at least one FPGA node in the matrix is configured to dispatch messages, and is further configured to identify a symbol or transaction identifier in the processed market data and distribute a subset of the market data to one or more trading algorithms based on content rules defining a partition on the symbol or the transaction identifier.

8. The network appliance of claim 7, wherein at least one FPGA node in the matrix is configured to dispatch messages and is further configured to distribute the subset of the market data responsive to user specified criteria for input to the one or more trading algorithms executed by at least one FPGA node.

9. The network appliance of claim 1, wherein the one or more trading algorithms is executed by one or more central processing units (CPUs) connected to the matrix of FPGA nodes.

10. The network appliance of claim 9, wherein the one or more CPUs is connected to the matrix of FPGA nodes using one or more PCIe connections.

11. The network appliance of claim 1, wherein the matrix defines at least one group of a plurality of the FPGA nodes, wherein the at least one group is further configured to:

synchronize execution across the members of the at least one group of the FPGA nodes;

receive and extract raw market data from a high volume real-time market data feed; and distribute the raw market data according to content rules defining processing responsibility for each node in the at least one group of the FPGA nodes; and wherein each FPGA node in the at least one group includes the at least one content based rule upon execution identifies a responsible node within the at least one group to process by the data based on identifying a symbol or transaction identifier.

12. The network appliance of claim 1, wherein the FPGA matrix is clock synchronized and can distribute any subset of data coming from the high-volume real-time market data feeds to the trading algorithm in a constant number of clock ticks.

13. The network appliance of claim 1, further comprising an aggregation component configured to:

store current assets for one or more data consumers; and dynamically generate an order book including at least current holdings of financial instruments reflecting the current assets responsive to processed data from the one or more high volume real-time market data feeds.

14. The network appliance of claim 1, further comprising an execution component configured to define trading transactions for execution responsive to the processed market data.

15. The network appliance of claim 1, wherein the FPGA nodes in the matrix are constructed and arranged on one or more FPGA boards.

16. The network appliance of claim 1, wherein the memory of the FPGA nodes includes at least one or more QDR memory chips.

17. The network appliance of claim 1, wherein the system is further configured to process the market data with an average latency of approximately 400 nanoseconds with a maximum latency of approximately 700 nanoseconds for ninety nine point ninety nine percent of measured period.

18. The network appliance of claim 1, wherein the first matrix of FPGA nodes comprises a first sub-appliance configured to communicate raw market data to a second sub-appliance configured to generate processed market data including updates of the one or more order books, order trades, and status for financial instruments from the raw market data.

19. A computer implemented method for processing high volume market data feeds, the method comprising:

receiving, at a network appliance comprising a matrix of at least three FPGA nodes having respective memory and I/O, trade data from one or more high volume market data feeds, wherein the matrix is housed on at least a first circuit board, and the network appliance includes at least one external link connected to the matrix of at least three FPGA nodes, wherein the at least one external link is connected to one or more high volume real-time market data feeds, wherein the real-time market data feeds are characterized by data burst conditions;

wherein each of the at least three FPGA nodes includes at least two physical links, the at least two physical links each being connected to respective ones of the other nodes in the matrix each of the at least two physical links comprises a low latency high bandwidth connection;

routing, the trade data by the one or more FPGA nodes within a matrix of FPGA nodes according to content based configurations responsive to analyzing raw market data;

processing the trade data at respective FPGA nodes with the matrix, wherein processing of the trade data includes synchronizing execution of the FPGA nodes with the matrix, wherein the synchronizing execution includes executing deterministically under a target maximum latency of 1 microsecond;

distributing, processed trade data to data consumers according to subscription information.

20. The method according to claim 19, further comprising:

receiving, directly, at the one or more FPGA nodes, trade data from a plurality of high volume market data feeds having a plurality of communication formats; and merging the trade data from the plurality of high volume market data feeds at another one of the at least three FPGA nodes.

21. The method according to claim 19, further comprising enabling deterministic distribution of the trade data within the matrix of FPGA nodes.

22. The method according to claim 21, further comprising communicating within the matrix of FPGA nodes using point to point connections, adding only a header and checksum to data payload.

* * * * *